Figure 1:
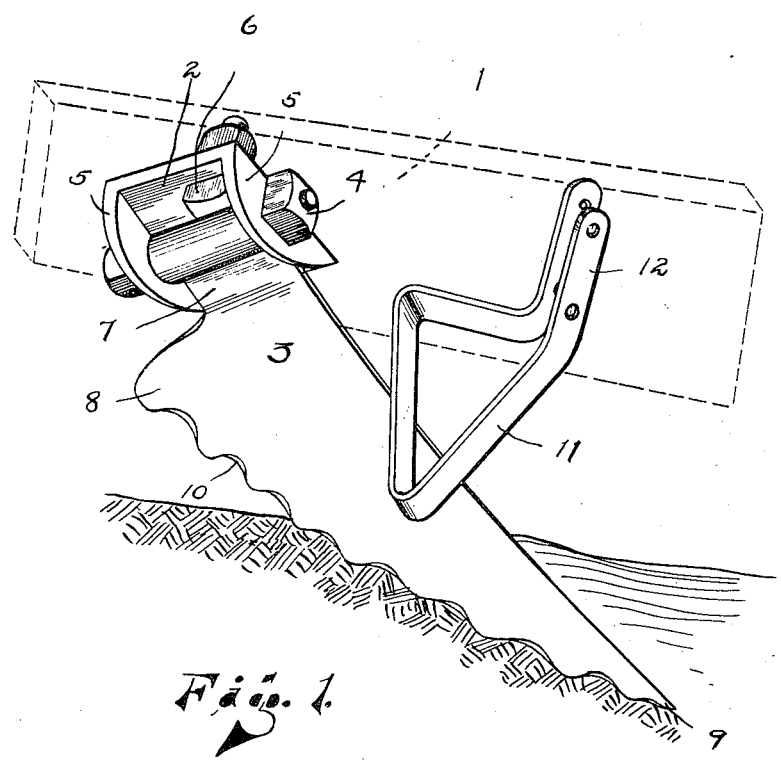

April 22, 1924.

J. HEIKKILA

PLOWCOLTER

Filed Sept. 25, 1922

1,491,398

Inventor
Jonas Heikkila.
Geo. Sterns.
Attorney

Patented Apr. 22, 1924.

1,491,398

UNITED STATES PATENT OFFICE.

JONAS HEIKKILA, OF CROMWELL, MINNESOTA.

PLOWCOLTER.

Application filed September 25, 1922. Serial No. 590,511.

*To all whom it may concern:*

Be it known that I, JONAS HEIKKILA, a citizen of the United States, residing at Cromwell, in the county of Carlton and State of Minnesota, have invented certain new and useful Improvements in Plowcolters, of which the following is a specification, reference being had therein to the accompanying drawing.

This invention relates to plow colters and the principal object is to produce a novel form of colter and brace therefor, the colter being pivotally mounted upon the beam of the plow in such a manner that it may be quickly swung out of action when desired.

Other objects and advantages of the invention will appear in the further description thereof.

Figure 2:
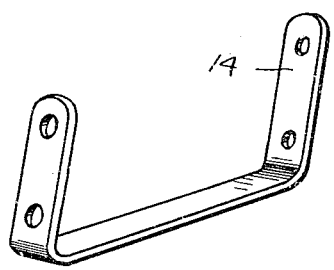

Referring to the accompanying drawing forming part of this application in which like reference characters indicate like parts:

Figure 1 is a perspective view of one of the improved colters and brace illustrative of the relative position on a plow beam, and Figure 2 is a perspective view of a clip or additional support for the colter cradle, when such is desired.

The element designated 1 represents the beam of a plow and 2 a cradle in which the colter 3 is pivotally mounted, as by a suitable bolt 4 fastened through the two outwardly projecting terminals 5 of the cradle. The latter is bolted to the beam of the plow diagonally upon the side thereof, one of the bolts being shown in the uppermost corner in the base of the cradle and illustrated at 6, while the other bolt is not shown but occurs directly beneath the bolt 6 in the lower corner of the cradle.

The colter 3 is preferably of somewhat wedge shape, that is to say greater in depth extending considerable below the pivotal shank 7, as at 8, and extending to substantially a point at the extreme end thereof, as at 9, the cutting edge being preferably convexed arcuately in form and sharpened in scallop like serrations as indicated at 10.

The principal object of the colter being pivotally united, as before stated, is that it may be quickly thrown about sideways and pivotally, and extend upwardly in the exact opposite direction to that shown in the drawing when it is not desired to use same in cutting sod, roots, or the like in front of the plow.

As a reinforcement or brace for the colter I have shown a convenient form of such at 11, the same being a substantially tri-angular shaped bracket, the two free ends 12 of which are bent upwardly and bolted with through bolts to the beam of the plow.

When the colter and brace are attached to a steel beam plow, it is apparent that no reinforcement or clip is necessary but when attached to a wooden plow it may be convenient to have provided a metal reinforcement as illustrated at 14, which may be made to surround the beam of the plow, or in the event of the plow having a double beam as for instance in the larger type of tractor plows, this brace may extend intermediate of the beams and be securely bolted thereto.

Having thus described my invention, what I claim and desire to secure by Letters Patent, is:

A colter for plow beams comprising a cradle securely bolted to the beam, and a depending knife like colter pivotally mounted within said cradle whereby when not in use the colter may be swung laterally in the cradle and vertically out of engagement with the soil being traversed, and a triangularly shaped brace at the rear of said colter fastened to the beam of the plow and engaging same.

In testimony whereof I hereunto affix my signature in the presence of two witnesses.

JONAS HEIKKILA.

Witnesses:
 JOHN E. HEIKKILA,
 WENDELL O. HEIMANEN.